United States Patent [19]

Itoh et al.

[11] 4,054,907
[45] Oct. 18, 1977

[54] BACK PROJECTION APPARATUS

[75] Inventors: Norio Itoh; Masayuki Omori, both of Tokyo, Japan

[73] Assignee: Sony Corporation, Tokyo, Japan

[21] Appl. No.: 659,687

[22] Filed: Feb. 20, 1976

[30] Foreign Application Priority Data

Feb. 28, 1975  Japan .............................. 50-25435

[51] Int. Cl.$^2$ ............................................. H04N 9/31
[52] U.S. Cl. ........................................ 358/60; 350/128
[58] Field of Search ........................... 358/60, 55, 92; 350/128

[56] References Cited

U.S. PATENT DOCUMENTS 3,166,635  1/1965  Todt ..................................... 358/60
3,858,001  12/1974  Bonne ................................... 358/92

Primary Examiner—Richard Murray
Assistant Examiner—Mitchell Saffian
Attorney, Agent, or Firm—Lewis H. Eslinger; Alvin Sinderbrand

[57] ABSTRACT

Three cathode ray tubes are provided for projecting and converging three different primary color images on a back projection screen. The back projection screen has a first cylindrically lenticulated face facing toward the cathode ray tubes for determining a viewing angle of the screen and a second cylindrically lenticulated face on the opposite side thereof for arranging in parallel the emergent light axes of three luminous fluxes respectively projected from the three cathode ray tubes. Color shading of the color image projected on the screen which would be caused by convergence of the three light axes extending from the cathode ray tubes is eliminated by the second cylindrically lenticulated face of the screen.

7 Claims, 4 Drawing Figures

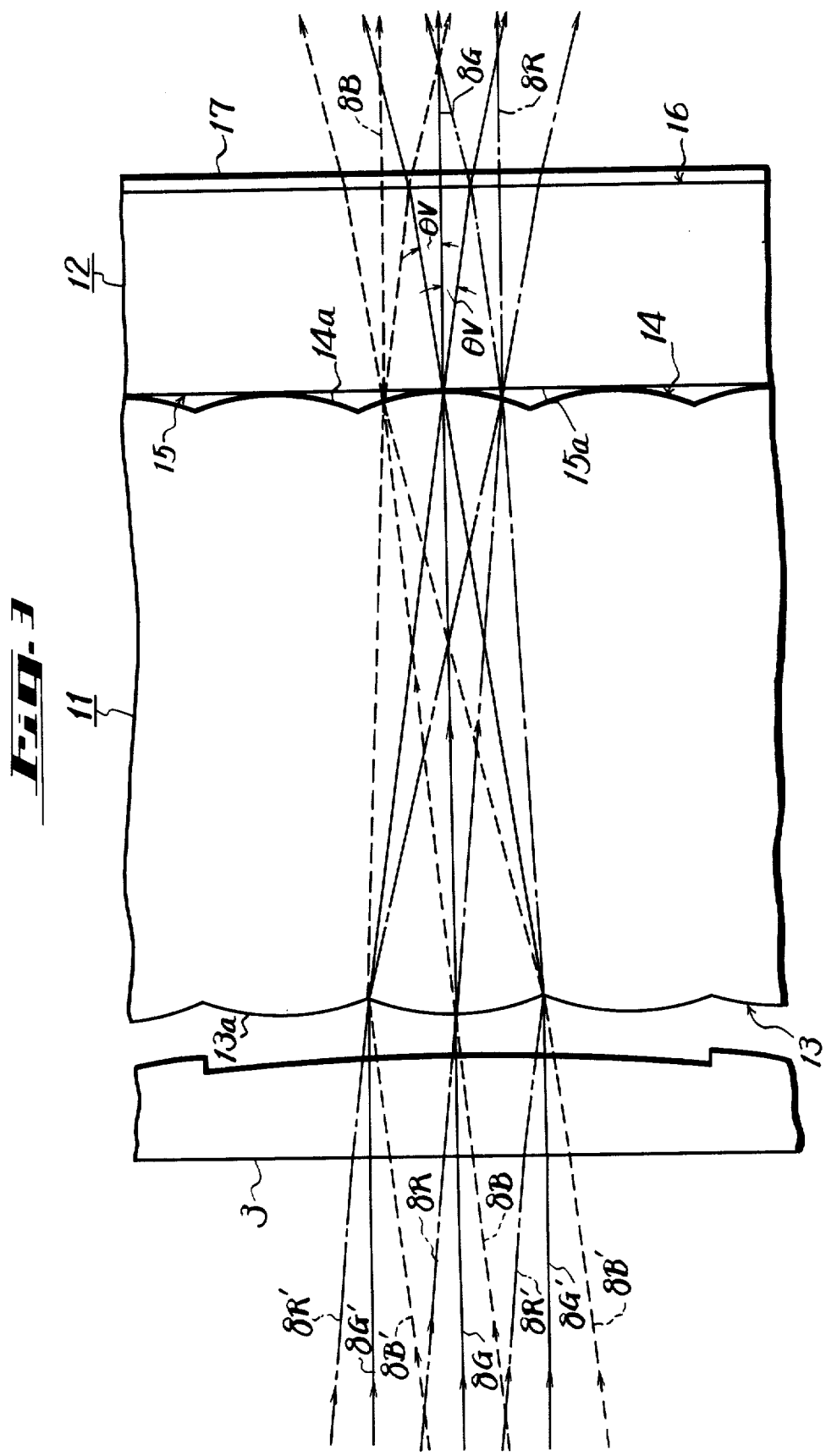

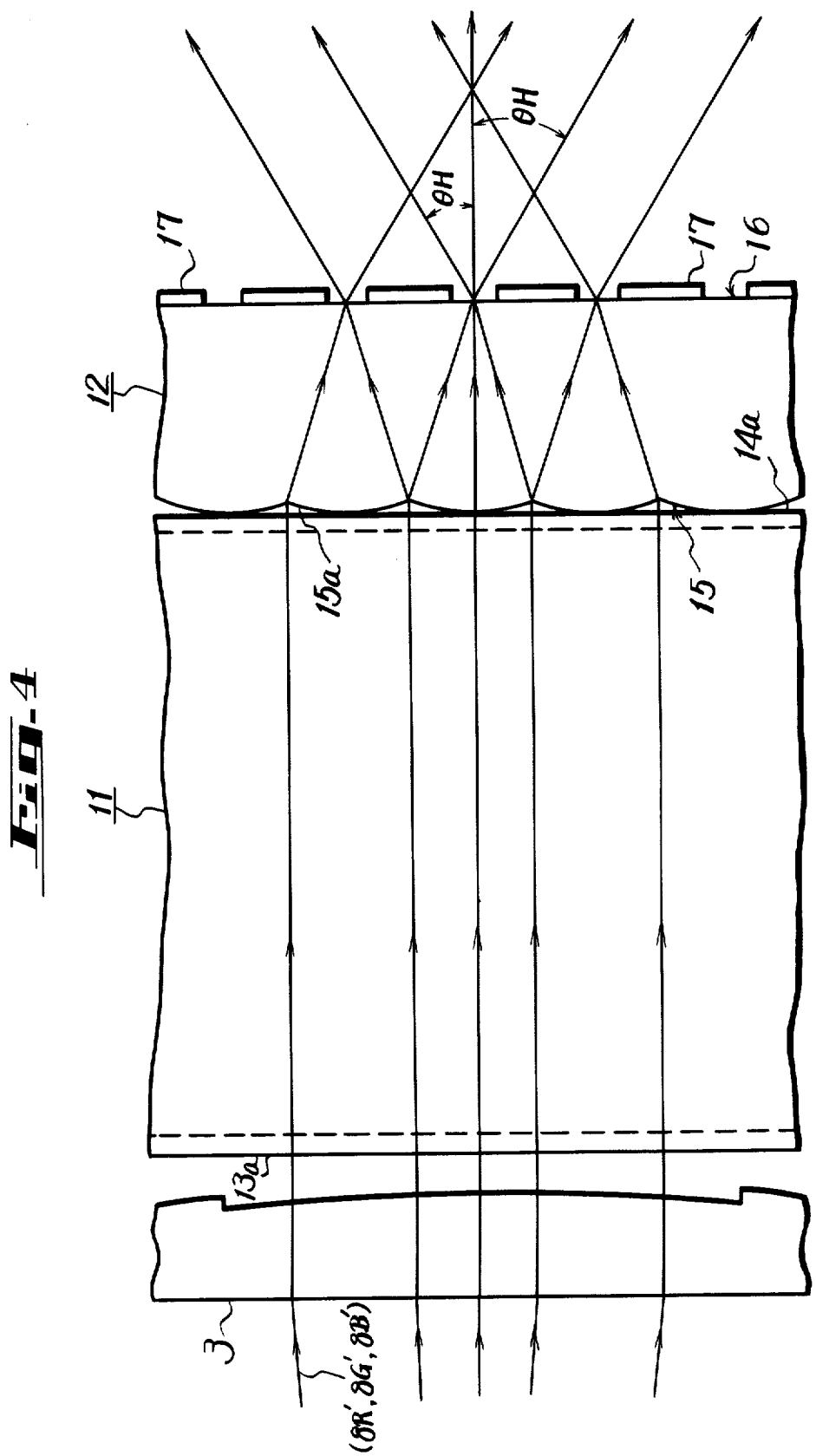

BACK PROJECTION APPARATUS

BACKGROUND OF THE INVENTION

1. Field of the Invention

This invention relates generally to a back projection apparatus for color image reproduction using three cathode ray tubes each producing a different primary color image, and is directed more particularly to a back projection screen suitable for reproducing a color image without color-shading.

2. Description of the Prior Art

It is known in the art to use a back projection apparatus using a cylindrically lenticulated lens for projecting an enlarged image on a screen from an image source. Conventionally, only one image source is used. However, in the case of using a cathode ray tube as the image source, a single cathode ray tube is insufficient to provide an adequate brightness. It is also known in the art to use a plurality of cathode ray tubes as image sources and to project on a screen an image synthesized by half-mirrors. In this case, a sufficient brightness can not be obtained owing to the loss of light by the half-mirrors.

SUMMARY OF THE INVENTION

It is an object of this invention to provide a back projection apparatus having a sufficient brightness.

It is another object of this invention to provide a back projection apparatus useful for displaying a color image.

It is still another object of this invention to provide a back projection apparatus which can project a color image on a screen without any color shading.

According to an aspect of the present invention there is provided a back projection system which comprises a plurality of color image sources which produce different color images respectively, a plurality of projecting lenses which are located in front of the image sources, and a screen which has a first lenticulated face facing toward the image sources and a second lenticulated face on the opposite side thereof. In such back projection system, the radial curvature of the lenticular lenses formed on the first lenticulated face of the screen is selected so that a viewing angle of the screen has a predetermined angle, and the radial curvature of the lenticular lenses formed on the second lenticulated face of the screen is selected so that the optical axes of the projected images from the image sources are arranged in parallel emerging from the second lenticulated face so as to prevent any color shading of a color image projected on the screen.

The above, and other objects, features and advantages of the invention, will become apparent from the following description to be read in conjunction with the accompanying drawings.

BRIEF DESCRIPTION OF THE DRAWINGS

FIG. 3 is an enlarged fragmentary vertical sectional view of the portion of the back projection screen shown in FIG. 2; and FIG. 4 is an enlarged fragmentary horizontal sectional view of the portion of the back projection screen shown in FIG. 2.

DESCRIPTION OF THE PREFERRED EMBODIMENT

Figure 1:
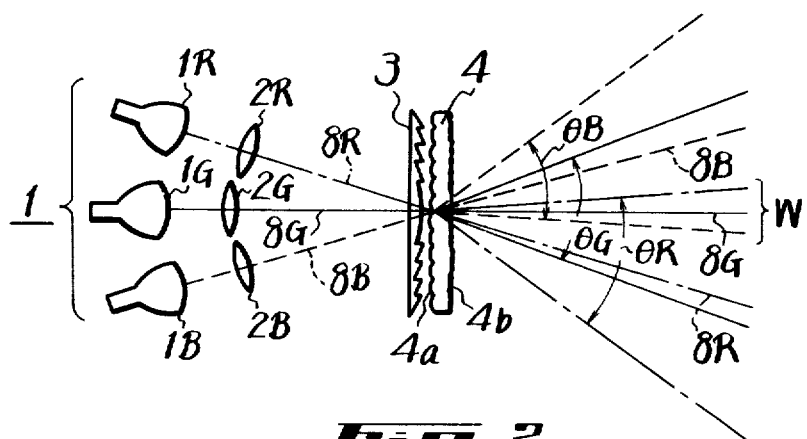
FIG. 1 is a schematic sectional view of an existing back projection apparatus used for explaining a principle of this invention.

FIG. 1 shows an existing 3-tube type color projection apparatus in which reference numeral 1 designates a cathode ray tube group which consists of three cathode ray tubes 1R, 1G and 1B arranged vertically for projecting three different primary color images of red, green and blue colors, respectively along coverging axes 8R, 8G and 8B. Further, as shown, projecting lenses 2R, 2G and 2B are located on the optical axes 8R, 8G and 8B, respectively.

In FIG. 1, a Fresnel correction lens 3 and a cylindrically lenticulated back screen. 4 are located so that the luminous fluxes from the respective cathode ray tubes 1R, 1G and 1B are focussed on the lenticulated back face of the cylindrically lenticulated back screen 4. The correction lens 3 serves to convergently change the directions of the light rays which, on emerging from the projection lenses 2R and 2B, diverge from the optical axes 8R and 8B at predetermined positions thereon and then to project the converged light rays on the lenticulated back screen 4. The back face of lenticulated back screen 4 is formed of a plurality of so-called cylindrical lenses 4a which are arranged in parallel. In the illustrated example, the plurality of cylindrical lenses 4a are extended laterally (in the horizontal direction). On the front face of the screen 4 opposite the face on which there are formed the cylindrical lenses 4a, there is formed a light-scattering surface on which a light absorbing material 4b is coated for absorbing external or ambient light except at the portions corresponding to the focal lines of the cylindrical lenses 4a. The description of the horizontal components of the respective luminous fluxes are omitted in the case of the existing back projection apparatus shown on FIG. 1.

With the above construction, the luminous fluxes from the respective cathode ray tubes 1R, 1G and 1B are diffused, that is, the luminous flux from the green cathode ray tube 1G is diffused at a diffusing (viewing) angle $\theta G$, that from the red cathode ray tube 1R is diffused at a diffusing angle of $\theta R$, and that from the blue cathode ray tube 1B is diffused at a diffusing angle of $\theta B$, respectively. Therefore, the composite color image of the primary color images from the respective cathode ray tube 1R, 1G and 1B has a narrow proper viewing angle W and so-called color shading is caused in the color image when viewed from other viewing angles. As a result, a color image with the correct hue can not be obtained.

In order to avoid such color shading, it may be, of course, considered to use a non-directional type of screen for example made of a ground glass, but in such case the image brightness is much reduced with the result that the advantage obtained by the employment of a plurality of cathode ray tubes disappears.

An embodiment of the invention, in which three cathode ray tubes are employed to increase the brightness, as in FIG. 1, but with a screen 10 of a special construction to prevent the appearance of any color shading, will now be described with reference to FIG. 2.

Figure 2:
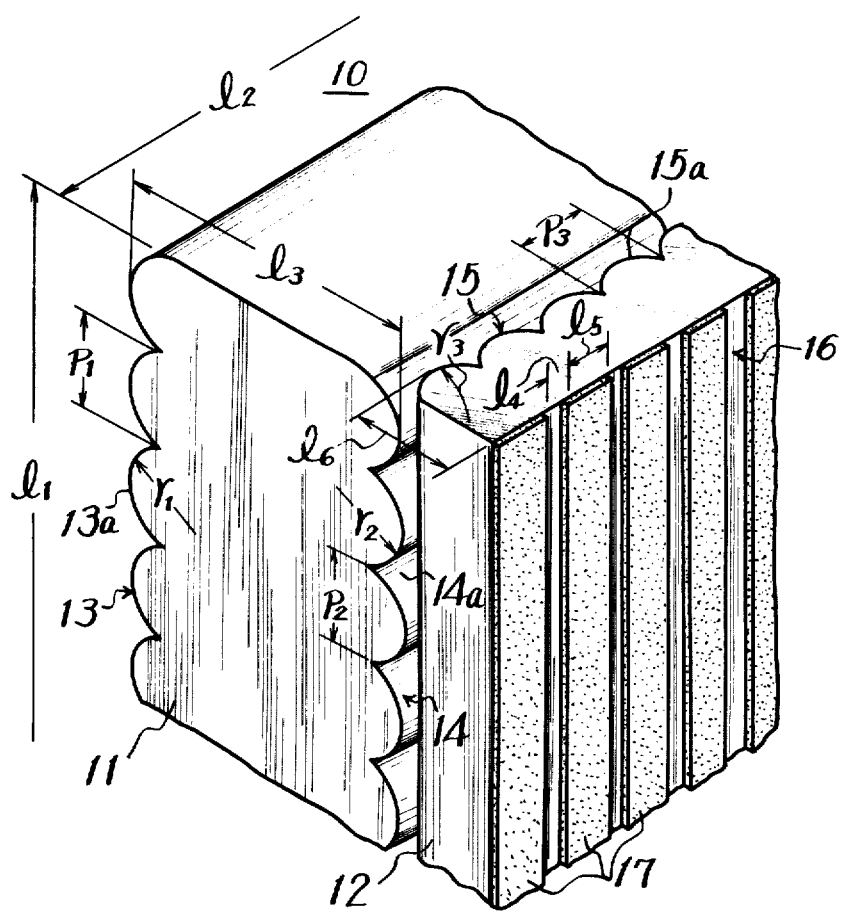
FIG. 2 is a fragmentary perspective view of a portion of a back projection screen according to this invention.

It will be understood that, although not shown on FIG. 2, the back projection apparatus or system of this invention includes, in addition to the screen 10, the cathode ray tube group 1 consisting of three cathode ray tubes 1R, 1G and 1B, projecting lenses 2R, 2G and 2B in connection therewith, and the correction lens 3 common thereto, as shown on FIG. 1.

As shown in FIG. 2, the screen 10 according to the invention and which replaces the screen 4 of FIG. 2, consists of a first screen 11 and a second screen 12 juxtaposed to the former. The first screen 11 is provided on its opposite faces 13 and 14 with cylindrical lenses 13a and 14a which are extended in thr horizontal direction, while the second screen 12 is provided with cylindrical lenses 15a, which are extended in the vertical direction, on its back face 15 facing toward the first screen 11 and with stripes of a light absorbing material 17 selectively coated on a plane (second) face 16 at the side opposite to the face 15. In an example of this invention, the dimensions of the first and second screens 11 and 12 are so selected that their longitudinal (vertical) length $l_1$ is 686 mm and their lateral (horizontal) length $l_2$ is 914 mm, which is a so-called "45" projection screen.

The first or back face 13 of the first screen 11 is formed as a cylindrical lenticulated face defined by the so-called cylindrical lenses 13a extended laterally (in the horizontal direction) so as to obtain an adequate viewing angle which will determine the viewing field of the screen. In an example of the invention, the radial curvature $r_1$ of each of cylindrical lenses 13a is selected as 1 mm and the pitch $p_1$ ofthe adjacent cylindrical lenses 13a is selected as 0.8 mm.

In order to cause the optical axes 8R, 8G and 8B of the respective cathode ray tubes 1R, 1G and 1B to coincide with one another, that is, to insure that the optical axes of the luminous fluxes from the respective cathode ray tubes become parallel with one another, on emerging from screen 11, the second face 14 of screen 11 is also made as a lenticulated face which consists of the cylindrical lenses 14a each extended in the horizontal direction similar to the first face thereof. In the described example, the radial curvature $r_2$ of each of the cylindrical lenses 14a is selected as 1 mm and the pitch $p_2$ of the adjacent cylindrical lenses 14a in the vertical direction is selected as 0.8 mm. In such example, the distance $l_3$ between each cylindrical lens 13a on the first face 13 and the corresponding cylindrical lens 14a on the second face 14 is selected as 3 mm.

With the first screen 11 constructed as described above, and as shown in FIG. 3, luminous fluxes 8R', 8G' and 8B' from the respective cathode ray tubes 1R, 1G and 1B passed through the correction lens 3 are converged by the cylindrical lenses 13a formed on the first face 13 of the first screen 11, and focussed thereby approximately at the second face 14 after which the luminous fluxes are diverged or diffused. In other words, the luminous flux 8G' from the cathode ray tube 1G incident on a cylindrical lens 13a of the first screen 11 at right angles is converged to the center of the respective cylindrical lens 14a formed on the second face 14 of the first screen 11 and thereafter diffused at a vertical viewing angle of 2 $\theta$V ($\pm 12°$). This vertical viewing angle 2 $\theta$V is determined by the radial curvature $r_1$ of the cylindrical lens 13a formed on the first face 13 of the first screen 11. The luminous flux 8R' from the cathode ray tube 1R incident on lenses 13a of the first screen 11 at a downwardly directed or depression angle of 8° is converged to a lower position of the respective cylindrical lenses 14a formed on the second face 14, and thereafter diffused at a vertical viewing angle of 2 $\theta$ V ($\pm 12°$). The luminous flux 8B' from the cathode ray tube 1B incident on lenses 13aof the first screen 11 at an upwardy directed or elevation angle 8° is converged to an upper position of the respective cylindrical lenses 14a formed on the second face 14, and then diffused at a vertical viewing angle of 2 $\theta$ V ($\pm 12°$). Thus, it will be apparent that the optical axes 8R, 8G and 8B of the respective cathode ray tubes 1R, 1G and 1B, on emerging from first screen 11, are made to coincide with one another in direction, or be parallel by means of the cylindrical lenses 14a, so that the appearance of any color shading can be prevented. FIGS. 3 and 4 show one optical path for one cylindrical lens, but it will be apparent that the same optical path can be formed as to all the cylindrical lenses.

In order to obtain an adequate horizontal viewing angle which will determine the viewing field of the screen, the first or back face 15 of the second screen 12 is made as a lenticulated face which consists of a number of so-called cylindrical lenses 15a extended in parallel with one another in the longitudinal (vertical) direction. In an example of the screen according to the invention, the radial curvature $r_3$ of each of the cylindrical lenses 15a is selected at 0.4 mm and the pitch $p_3$ of the adjacent cylindrical lenses 15a in the horizontal direction is selected as 0.6 mm, respectively.

The second or front face 16 of the second screen 12 is made flat or planar and the light absorbing material 17 is coated on the flat face 16 in a stripe pattern so as to avoid reflection of external or ambient light thereon as described previously. The light absorbing material 17 is coated on the second face 16 to form longitudinal (vertical) stripes with a pitch concident with the pitch that $p_2$ between the adjacent cylindrical lenses 15a formed on the first face 15 of the second screen 12. In the example of the invention, the ratio of $l_4$ and $l_5$, where $l_4$ represents the gap between the adjacent stripes made of the light absorbing material 17 and $l_5$ the width of each of the stripes made of the light absorbing material 17, is selected as 1 : 2, and the thickness $l_5$ of the second screen 12 is selected as 1.0 mm.

Thus, the luminous fluxes 8R', 8G' and 9B' from the respective cathode ray tubes 1R, 1G and 1B and passed through the correction lens 3 are converged laterally or in the horizontal direction by the cylindrical lenses 15a formed on the first face 15 of the second screen 12 as shown in FIG. 4. In this case, the luminous flux in the horizontal direction is converged to the second face 16 of the second screen 12, and thereafter is diffused. With such a construction, the horizontal viewing angle 2 $\theta$H becomes $\pm 30°$. This horizontal viewing angle 2 $\theta$H will be determined by the radial curvature $r_3$ of the cylindrical lenses 15a.

As described above, in accordance with the invention, in a back projection system with in which the luminous fluxes from plural image sources different in color are projected on the screen substantially at the same position through the respective projection lenses and correction lens, the screen made of transparent material has a first face facing the image sources formed as a curved face so as to obtain a predetermined viewing angle which will determine the viewing field of the screen, and a second face of the screen opposite to the first face is made as a curved face so as to make the optical axes of the luminous fluxes from the plural image sources become approximately parallel or coincident in direction afer the luminous fluxes pass through the second face, so that sufficient brightness can be obtained, the appearance of color shading can be substantially avoided, and various factors, such as, sufficient horizontal and vertical resolutions, horizontal viewing area and vertical viewing area and so on, which are necessary for the back projection type system, can be achieved.

Therefore, with the back projection system according to the invention the quality of a picture is not so rough as in the case of the prior art in which the desired viewing angle is obtained by roughening the face of the screen, and hence the resolution is not deteriorated as in the prior art.

Further, since with the invention the diffusion degree of the luminous fuxes can be selected freely by changing the radial curvature of the cylindrical lens, the brightness all over the screen can be improved.

Although a preferred embodiment of the invention has been described above with reference to the drawings, it will be apparent that many modifications and variations could be effected therein without departing from the spirit or scope of the invention as defined in the appended claims. By way of example, the first and second faces 13 and 14 of the first screen 11 could be formed of predetermined small spherical rather than cylindrical lenses or the second face 14 could be formed as a trapezoidal face so as to make the optical axes of luminous fluxes from the image sources coincident or parallel with one another or emerging from face 14.

We claim as our invention:

1. A back projection apparatus for displaying a color image comprising
    a screen including a light-transmitting screen member having lenticulated front and rear faces;
    a plurality of spaced apart color image sources disposed in back of said screen and producing a plurality of respective color images of different colors; and
    projection lens means disposed between said color image sources and said screen for projecting said plurality of different color images from said spaced apart sources thereof along convergent optical paths to said rear face of the screen member;
    said rear face of the screen member being constituted by lenticular lenses with the thickness of said screen member between said front and rear faces thereof and the radial curvature of said lenticular lenses being dimensioned to focus said different color images substantially at said front surface of the screen member and to provide a predetermined viewing angle of the resulting composite color image on the screen, and said front face of the screen member being constituted by lenticular lenses having a radial curvature which causes said optical paths of the projected different color images, on emerging from said front face, to be in parallel relation to each other for preventing color shading of said composite color image.

2. A back projection apparatus according to claim 1; in which said color image sources are constituted by respective cathode ray tubes each producing a different primary color image.

3. A back projection apparatus according to claim 1; in which said lenticular lenses or the rear face are first cylindrical lenses arranged parallel to each other, and said lenticular lenses of the front face are second cylindrical lenses arranged parallel to each other and also parallel to said first cylindrical lenses.

4. A back projection apparatus according to claim 3; in which said color image sources are spaced apart in a direction at right angles to the longitudinal directions of said first and second cylindrical lenses.

5. A back projection apparatus according to claim 3; in which said screen further includes a second screen member disposed in front of the first mentioned screen member, said second screen has a lenticulated rear face directed toward said front face of said first screen member and being constituted by cylindrical lenticular lenses extending parallel to each other and at right angles to the longitudinal directions of said cylindrical lenses of said first screen member, and said second screen member has a planar front face directed away from said first screen member 6. A back projection apparatus according to claim 5; in which said planar face of the second screen member has parallel, spaced apart strips of light absorbing material thereon leaving clear areas of said planar face at foci of said cylindrical lenticular lenses of the second screen member.

7. A back projection apparatus according to claim 6; in which said projection lens means includes individual projection lenses for said color image sources, respectively, and a correction lens interposed between said projection lenses and said screen.

* * * * *